United States Patent [19]

Beyers, Jr.

[11] Patent Number: 6,072,804
[45] Date of Patent: Jun. 6, 2000

[54] RING BUS DATA TRANSFER SYSTEM

[75] Inventor: Billy Wesley Beyers, Jr., Greenfield, Ind.

[73] Assignee: Thomson Consumer Electronics, Inc., Indianapolis, Ind.

[21] Appl. No.: 08/952,369

[22] PCT Filed: May 24, 1996

[86] PCT No.: PCT/US96/07697

§ 371 Date: Nov. 17, 1997

§ 102(e) Date: Nov. 17, 1997

[87] PCT Pub. No.: WO96/37985

PCT Pub. Date: Nov. 28, 1996

[30] Foreign Application Priority Data

May 24, 1995 [GB] United Kingdom .................... 9510508
Jun. 5, 1995 [GB] United Kingdom .................... 9511327

[51] Int. Cl.[7] .......................... H04L 12/403; H04L 12/43
[52] U.S. Cl. ............................................. 370/450; 370/461
[58] Field of Search ..................................... 370/258, 404, 370/407, 403, 410, 419, 439, 447, 452, 460, 455, 462, 465, 508, 907, 909, 450; 395/200.08, 293, 728, 800; 710/106, 123

[56] References Cited

U.S. PATENT DOCUMENTS

| | | | |
|---|---|---|---|
| 4,646,291 | 2/1987 | Perntz et al. ............................ | 370/508 |
| 4,833,695 | 5/1989 | Greub ...................................... | 375/317 |
| 4,858,232 | 8/1989 | Diaz et al. .............................. | 370/465 |
| 4,897,833 | 1/1990 | Kent et al. .............................. | 370/447 |
| 5,003,508 | 3/1991 | Hall ......................................... | 710/106 |
| 5,041,963 | 8/1991 | Ebersole et al. ........................ | 370/407 |
| 5,043,938 | 8/1991 | Ebersole ............................... | 395/200.8 |
| 5,107,490 | 4/1992 | Wilson et al. .......................... | 370/447 |
| 5,181,202 | 1/1993 | Walser et al. ........................... | 370/452 |
| 5,347,515 | 9/1994 | Marino .................................... | 370/447 |
| 5,388,228 | 2/1995 | Heath et al. ............................ | 710/123 |
| 5,506,972 | 4/1996 | Heath et al. ............................ | 710/113 |
| 5,787,264 | 7/1998 | Christensen et al. .................. | 395/293 |
| 5,886,992 | 3/1999 | Raatikainen et al. .................. | 370/410 |

FOREIGN PATENT DOCUMENTS 0403364 12/1990 European Pat. Off. .
0436932 7/1991 European Pat. Off. .

OTHER PUBLICATIONS

IEEE Transactions on Communications, vol. com–20, No. 3, Jun. 1972, New York, L.P. West "Loop–transmission control structures", pp. 531–539.

Electronik, vol. 39, No. 11, May 1990, Munchen DE, J. Sorgenfrei et al. "Schnittstellen–IC Fur den seriellen Kfz-–Bus", pp. 140–143.

*Primary Examiner*—Chau Nguyen
*Assistant Examiner*—Chiho Andrew Lee
*Attorney, Agent, or Firm*—Joseph S. Tripoli; Peter M. Emanuel; David T. Shoneman

[57] ABSTRACT

A data transmission bus system is disclosed which includes a plurality of nodes coupled together by a ring bus. The ring bus transmits data in successive bus cycles, each bus cycle containing a plurality of bus words. One of the bus words in the bus cycle is a bus cycle synchronization word and the remainder of which are data words. The plurality of data words are allocated to a plurality of data channels.

17 Claims, 3 Drawing Sheets

RING BUS DATA TRANSFER SYSTEM

The present invention relates to data bus systems and, in particular, to a ring bus data transfer system useful for interconnecting consumer electronic equipment. Systems such as digital video signal processing systems process data at high data rates and require correspondingly high bandwidth bus systems for data communication. For example, digital video data in MPEG format exhibits data rates of 4 to 8 Mbits per second. A bus system based on packetized data may provide sufficient bandwidth. However, hardware and software for implementing packetized systems may be costly, making it impractical for consumer electronic equipment. In addition, a packet bus may require excessive "overhead" such as packet processing delays that preclude providing the high data rates required for MPEG data transfer. Also, MPEG decoders in video signal processing systems rely on data arriving at a relatively constant rate (i.e. having a relatively constant transmission delay). In other words, the data jitter must be relatively low. A bus system such as a packetized system may have too much variation in the data transmission delay among packets to operate properly with MPEG decoders.

A high data rate data transfer bus which may be constructed with relatively low cost hardware and software, which does not require a high data overhead, and which has a relatively constant transmission delay, is desirable for interconnecting consumer electronic equipment, in particular video signal processing equipment.

In accordance with principles of the present invention, a data transmission bus system includes a plurality of nodes coupled together by a ring bus. The ring bus transmits data in successive bus cycles, each bus cycle containing a plurality of bus words. One of the bus words in the bus cycle is a bus cycle synchronization word and the remainder of which are data words. The plurality of data words are allocated to a plurality of data channels.

Principles of the invention are embodied in the BeeBus (BBUS) which is a high data rate bus system that may be used for transfer of digital video data. The BBUS system is a time division multiplexed (TDM) bus with a total capacity of 88 Mbits/sec. The BBUS is designed to transfer data transparently from a source node to a destination node on transfer data transparently from a source node to a destination node on the bus. The BBUS operates by serially transmitting nine-bit words from node to node on the ring. Synchronization is maintained among the nodes by transmitting bus cycles of 88 nine-bit words, with the initial word of each bus cycle being a bus cycle synchronization word. Because it may be desired to connect to consumer electronic equipment which has been designed to attach to a prior art consumer electronic bus, called the CEBUS, the BBUS system includes a CEBUS-compatible control channel. One bit of the bus cycle synchronization word carries the data for the CEBUS-compatible control channel. The BBUS is designed to carry eight data channels, which can be grouped into blocks to provide the necessary capacity for any combination of number of channels and channel capacity as long as the total number of channels is eight or less, and the total assigned capacity is 88 Mbs or less.

The CEBUS-compatible control bus included in the BBUS system has a message structure that does not involve arbitration on transmission. Each device has a preassigned control channel slot with a capacity well in excess of 10 kbs. Each device has the channel capability to receive messages from 31 other devices simultaneously. However, it is envisioned that the receiving device will process only one message at a time. Thus arbitration will be done by the receiving device, not the transmitting device. The receiving device will process messages in a round robin fashion, one message at a time. Because the message length is about 32 bytes, all control channel messages will be sent with this fixed length, and all messages will start with the same control cycle time slot. This slot is the basic operating system sync. It occurs every 32 control device slots×32 message slots which is approximately 8 ms, as explained below. Thus a control channel message can be sent every 8 ms. (Sixteen device to device messages could be sent simultaneously.) This compares to about 25 ms for a CEBUS control message.

Figure 1:
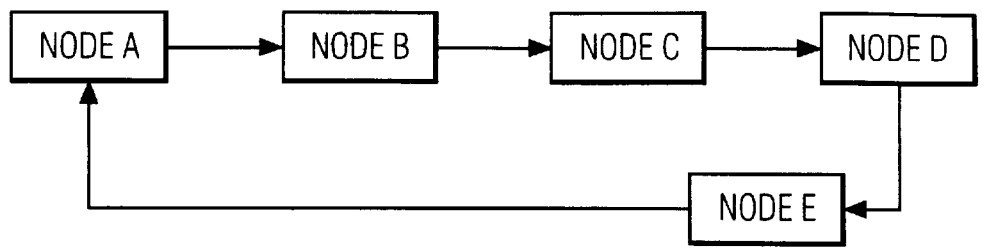
FIG. 1 is a block diagram of a data bus system according to principles of the present invention.
Figure 2:
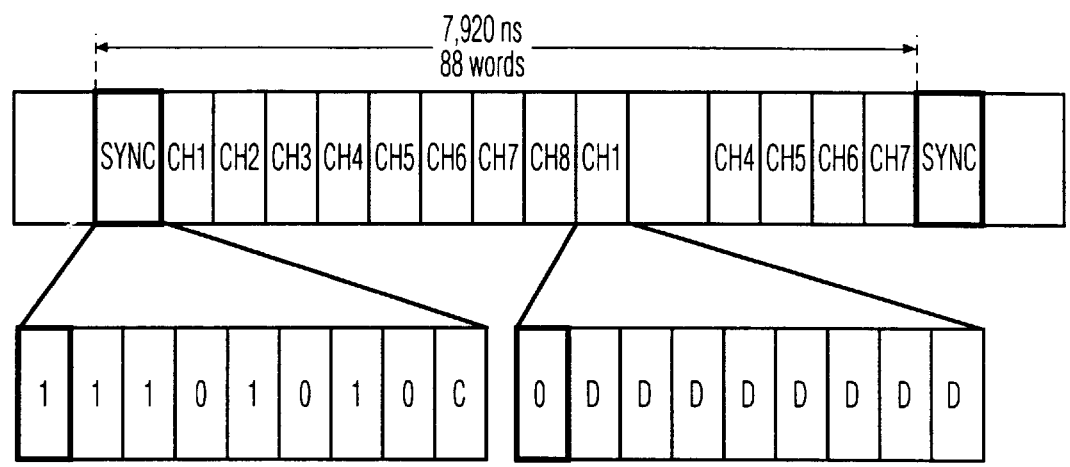
FIG. 2 is a diagram illustrating the format of the data transmitted around the ring of nodes illustrated in FIG. 1.

FIG. 1 is a block diagram of a data bus system according to principles of the present invention. Five nodes, node A, node B, node C, node D and node E, are interconnected by a bus with a ring structure as shown in FIG. 1. Data is transferred from one node to the next in the ring in a format illustrated in FIG. 2. In FIG. 2, data words are represented by a series of rectangles at the top of the figure. The basic data word in the system contains nine bits. Eight bits (one byte) are payload and one bit is used for link level control. There are 88 nine-bit data words transmitted in a bus cycle. With a bit rate clock of 100 MHz (i.e. a period of 10 ns), each nine-bit word is 90 ns long. Thus, the fundamental bus cycle in the system is 7,920 ns, or 88 counts of nine 10 ns clock cycles. One sync word is transmitted by the bus cycle master every 7,920 ns. This provides a payload of 87 data words every 7,920 ns or 10,984,848 bytes/per sec. The maximum BBUS data rate is, therefore, 87,878,787.88 Mbits/sec. The data words in the data stream are allocated among 8 channels. Each data channel receives a slot and transmits a word every 90 ns×8 channels=0.720 $\mu$s. Thus, the data channels are protocol independent channels with constant delay and with jitter of less than 1 $\mu$s per 11 Mbs of capacity.

Referring to FIG. 2, the first nine-bit data word of a bus cycle is a synchronization word (SYNC). This is followed by a data word carrying data for channel 1 (CH1). This is followed by data words carrying data for channels 2 through 8 (CH2 through CH8). This cycle of data words for the respective channels is repeated for the remaining 87 time slots in the bus cycle.

As will be described in more detail below, one bit of the synchronization word is allocated to the CEBUS-compatible control channel. Thus, the control bus has a maximum data rate slightly higher than 126 kbits/sec. The control channel throughput is slightly higher than 10 kbits, roughly the same as CEBUS, due to the CEBUS CSMA-CD arbitration method used to arbitrate for access to the bus by the devices coupled to the CEBUS.

Figure 3:
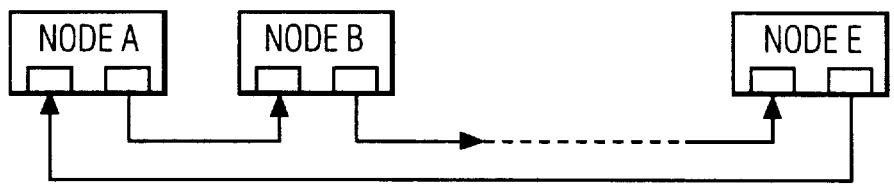
FIG. 3 is a block diagram of a prior art arrangement for interconnecting nodes in a ring structure.

The basic physical and electrical connectivity of the BBUS is a daisy chained ring with an input and an output in each device or instrument. FIG. 3 is a block diagram of a prior art arrangement for interconnecting nodes in a ring structure. Each node in FIG. 3 includes an input connector, illustrated on the lower left of each node, and an output connector, illustrated on the lower right of each node. A first cable is connected between the output connector of node A to the input connector of node B. In a similar manner, a cable are connected between the output connector of node B and the input connector of node C (not shown), and in general from the output connector of a node to the input connector of the succeeding node. The last node illustrated in FIG. 3 is node E. To complete the ring, a cable is connected from the output connector of node E to the input connector of node A.

To avoid the need to make the final link in the daisy chain to connect the last node with the first node, data in the return path can be time multiplexed with the forward path. Alternatively, a set of wires can be included in each cable for the reverse path. The latter approach is preferred because time multiplexing reverse and forward paths reduces the available capacity by half.

Figure 4:
FIG. 4 is a block diagram of a method of interconnecting nodes in a ring structure embodying the present invention.

FIG. 4 is a block diagram of a method of interconnecting nodes in a ring structure embodying the present invention. In FIG. 4 each cable includes the wires necessary for the forward path from a node to the succeeding node, and the wires for the return path from the output connector of the final node to the input connector of the first node. When the reverse path wires are included in the cable as in FIG. 4, the BBUS cable of the illustrated embodiment requires eight wires four in each direction. In addition a ground/shield is included and a pin to indicate that a cable is connected to the port. This pin is wired to the ground/shield.

Figure 5:
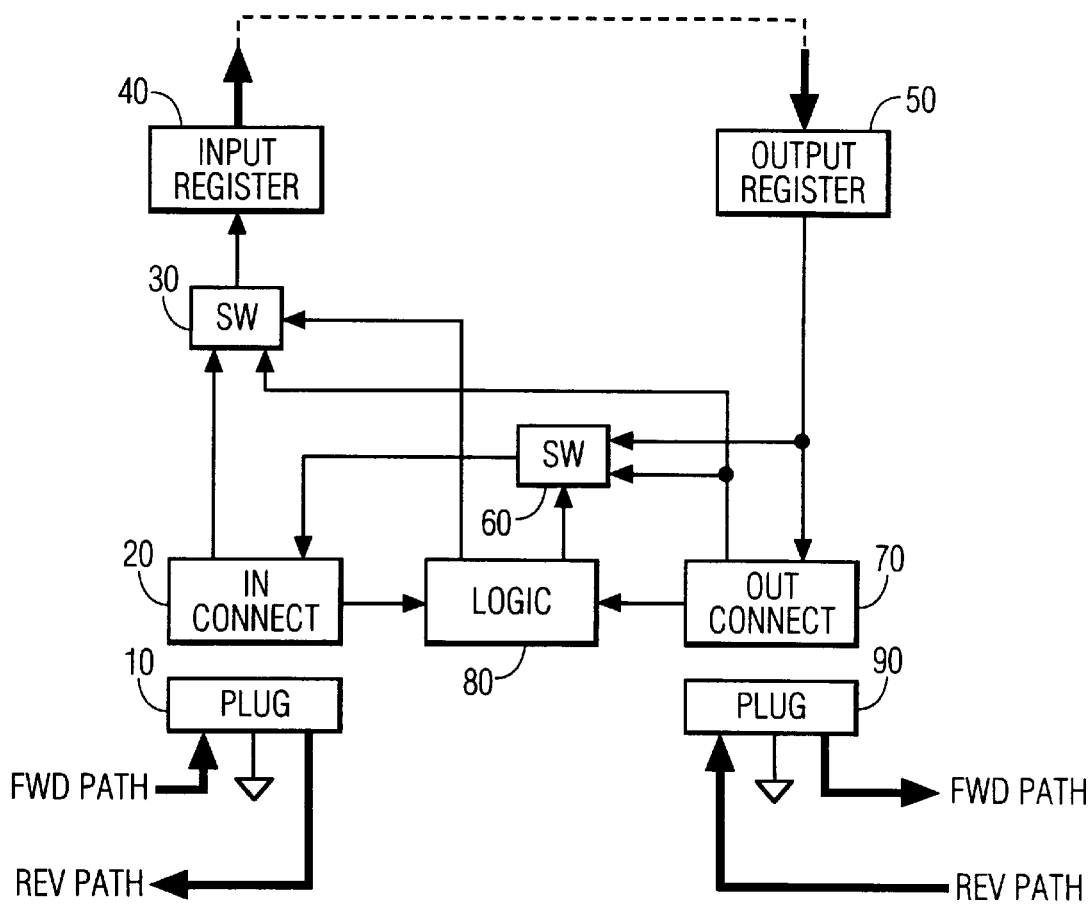
FIG. 5 is a block diagram of the circuitry necessary for connecting a node with the input and output cables.

FIG. 5 is a block diagram of the circuitry in a node necessary for connecting a node with the input and output cables. In FIG. 5, an input connector 20 receives a cable from a preceding node. This cable is terminated in a plug 10, and receives the wires making up the forward path from the preceding node to this node, and wires making up the reverse path from the final node to the first node. In addition, as described above, one pin on the plug is coupled to a source of a reference (ground) potential. The data and clock wires from the forward path at the input connector 20 are coupled to a first input terminal of a first switch circuit 30. An output terminal of the first switch circuit 30 is coupled to an input terminal of an input serial-to-parallel shift register 40, and an output terminal of the input register 40 is coupled to utilization circuitry in the node (not shown), of a known design.

The utilization circuitry (not shown) of the node is also coupled to an input terminal of an output parallel-to-serial shift register 50. An output terminal of the output register 50 is coupled to a first input terminal of a second switch circuit 60 and to an input terminal of an output connector 70. The output connector 70 receives a cable from the next succeeding node. This cable is terminated in a plug 90. The plug 90 also includes wires making up the forward path to the next succeeding node, and wires making up the reverse path from the last node to the first node. The output terminal of the output register 50 is coupled to the forward path through the output connector 70 and the plug 90.

The reverse path wires are received at plug 90, and supplied to the output connector 70. The input wires from the reverse path are coupled to a second input terminal of the first switch 30, and to a second input terminal of the second switch 60. An output terminal of the second switch 60 is coupled to an output terminal for the reverse path at the input connector 20. The output terminal of the second switch 60 is then coupled to the reverse path through the input connector 20 and the plug 10.

The input connector 20 and the output connector 70 also have a wire connected to a logic circuit 80. The pin on the input connector coupled to the grounded wire illustrated on the plug 10, and the pin on the output connector 70 coupled to the grounded wire illustrated on the plug 90 are coupled to the logic circuit 80. This wire will be pulled high in the input connector 20 and the output connector 70, and pulled down by the grounded terminal in the plug 10 or 90, respectively. Respective control output terminals of the logic circuit 80 are coupled to corresponding control input terminals of the first and second switches, 30 and 60.

In operation, when a cable is inserted into either the input connector 20 or the output connector 70, the logic circuit 80 will detect this by the ground potential at the input terminal corresponding to that input connector. This is used to route the input signal from the appropriate connector (20 or 70) to the input register and to route the output register 50 to the appropriate connector 20 or 50. For example, the first node in the daisy chain will have no cable connected to its input connector 20, but will have a cable connected to its output connector 70. The logic circuit 80 detects this arrangement. It conditions the first switch 30 to couple the input wires from the reverse path at plug 90 to the input register 40. The output register 50 is coupled to the forward path at the output connector 70. This first device is also designated the bus master.

Similarly, the last device in the daisy chain will have a cable connected to its input connector 20, but not have a cable connected to its output connector 70. The logic circuit 80 detects this arrangement. It conditions the first switch 30 to couple the wires from the forward path at the input connector 20 to the input register 40. It also conditions the second switch 60 to couple the output register 50 to the wires of the reverse path at the input connector 20. Devices in the middle of the daisy chain, have cables connected to both the input connector 20 and the output connector 70. The logic circuit 80 detects this arrangement. It conditions the first switch 30 to couple the wires from the forward path at the input connector 20 to the input register 40. The output register 50 is coupled to the wires of the forward path at the output connector 70. It also conditions the second switch 60 to couple the wires from the reverse path at the output connector 70 to the wires of the reverse path at the input connector 20. No processing connection is made to the reverse path wires and they are simply connected through the instrument. This arrangement reduces the necessity for software controlling the operation of the node to determine port connectivity.

If system considerations do not require a shield in the cable, an RJ45 connector can be used. In this case, the presence or absence of a cable in a connector will be determined by sensing clocks on input wires and measuring current on output wires. In this embodiment, such sensing circuitry will be connected between the input connector 20 and the logic circuit 80, and between the output connector 70 and the logic circuit 80, and will supply logic signals to the logic circuit 80 to indicate the presence or absence of a bus connection based on the results of that sensing. Use of an RJ45 connector permits using a relatively inexpensive cable and printed circuit board (PCB) connector which may be desirable in consumer electronics systems.

The control channel protocol in the BBUS is similar to that used for CEBUS. The message structure and encoding are substantially the same as for CEBUS. This results in one message approximately every 25 ms. The control channel is described in more detail below.

BBUS synchronization is addressed in the following manner. A problem with a daisy chain ring bus connected via a serial link is that one node must start an initialization process to cause all nodes to operate in sync and then handle other initialization operations such as node numbering. This process is greatly simplified if one node can become the undisputed master of the ring communication. This is accomplished by defining the bus master to be the one node that has no cable directly connected to its input connector 20, which may be determined as described above. The bus master will initiate the following operations (described in more detail below):

1) Word sync
2) Cycle sync
3) Node numbering
4) Delay compensation.

The format of data words in the BBUS is as follows. Node to node communication is accomplished by bit serial transmission of a 9 bit word from one node to the next, as described above. The word is read into the node input shift register 40, transferred to the output shift register 50, (as indicated in phantom in FIG. 5) and then transmitted to the next node.

One bit of the word, e.g., the most significant bit, is a link level control bit. An example of the control bit definition is:

1=Sync information
0=Payload.

For example, refer to FIG. 2. The synchronization word (SYNC) inserted into the data stream at the beginning of each bus cycle, indicated by the thick rectangle, includes nine bits, as indicated by the bit expansion below the data stream representation. The most significant bit, indicated by a thick rectangle in the bit expansion, is a logic '1' bit. On the other hand, the nine-bit data word carrying the second channel 1 word in this cycle, has a most significant bit, also indicated by a thick rectangle, which is a logic '0' bit, as indicated in the bit expansion below the data stream representation.

The initialization of the daisy chain ring bus, referred to above begins with word synchronization. Word synchronization is achieved by the master node transmitting a sync code (described in more detail below) at its output connection 70 after power is initially applied to the system. The master node then begins to examine the data received at its input connection 20 for the return of the word sync code by examining its input register 40 (which in a preferred embodiment is a 19 bit register) until the word sync code is detected. The description below is based on the word sync code being a single nine-bit word. However, the word sync code may be a sequence of two or more code words. When the word sync code has been detected, word sync has been achieved.

Delays in such a ring of nodes may be a non-integer number of nine-bit word times as a result, for example, of processing and cable-related delays. To adjust for non-integer word time delays, input shift register 40 can contain a number of bits greater than that needed to store one word of data. As an example, a preferred embodiment of input shift register 40 contains 19 bits. To ascertain delay, the data in input register 40 is examined at integer word times. The position of the nine-bit sync word in the 19-bit shift register indicates a delay relative to an integer word time. The delay is used to adjust the timing of subsequent words. For adjacent nodes, except the master node, the clock accompanies the data, and, thus, is delayed the same as the data so there is no timing delay apparent to the node. Since the master node has a reference clock, the delay through the complete ring is apparent to the master node. The extent of the delay is limited by cable length to less than one word, except for integer word delays at each node. The 19-bit input shift register 40 of each non-master node can be used to provide additional word delays as needed, in a manner to be described in more detail below.

Timing signals in each node are provided as follows. Each node has two clocks. The input data from the input connector 20 to the input shift register 40 is shifted in by the clock derived from strobes from the immediately preceding node, as received at the input connection 20 (or output connection 70 for the master node). Each node also has its own internal crystal clock which it uses to drive its output shift register 50 and its internal logic. It is, thus, possible that the internal clock is either faster or slower than the input clock by a small amount and this must be corrected. In the case that the input clock is faster than the internal clock, the additional input clock cycle is absorbed by allowing the input word to be shifted an additional bit in the input shift register 40. In the case that the internal clock is faster than the input clock, the data input time cycle as defined by the internal clock is extended an extra clock cycle, while the input data is being shifted into the input shift register 40. The above has the cumulative effect of slowing the ring to the speed of the slowest node internal clock.

Bus cycle counters within each node are synchronized by resetting all the cycle counters when a cycle sync word (described below) is read into a node at the end of the input cycle. Thus, each node goes through the same states as the previous node, delayed by one received word time plus cable propagation delay. The timing state of each node, except the master node, is synchronized by the receipt of the cycle sync word to compensate for the delay. For example, if the total cable length is limited to 10 meters, then the total delay through the cable is on the order of 50 ns or five clock cycles for a 100 MHz clock. Thus, less than one word is stored in the cable. The cable length may be significantly longer when the return path is included, and the added length must be considered when designing a cable driver. Also, each node has a potential additional delay which is less than one clock cycle.

The basic bus cycle described above, and illustrated in FIG. 2, is 88 nine-bit words, or 88×9=792 clock cycles, in duration. The channel counter may be designed such that if any data channel needs more than 1 Mbs capacity, additional slots within the basic channel data counter may be assigned in such a manner as to minimize jitter. To accomplish this when multiple nodes use arbitrary size data channels, the capacity allocation task is assigned to the application level, and the application level is given the task of allocating time slots for each data channel.

Alternatively, an approach that reduces application overhead is to pre-assign 8 major channels of 11 Mbs capacity each to ensure jitter of less than 1 $\mu$s/channel, as is illustrated in FIG. 2. These 8 major channels may now be simply assigned, and the channel counter will be designed to spread these 8 major channels among 88 channel slots, also as illustrated in FIG. 2. Each of the 8 slots are independent of each other in determining jitters and can be independently assigned by each node (but only one node may use each of the 8 channels.) The control channel is separately assigned and has jitter of 8 $\mu$s.

In regard to node synchronization and node addressing, several features must be provided. These features include word synchronization and bus cycle synchronization (both described above), message synchronization, node addressing and an indication that no data is present in a data slot (all described below). To this end, several special synchronizing and addressing words are provided and are identified by having a logic '1' as the most significant bit in the nine-bit data word. In the present embodiment, the system is limited to no more than 32 nodes. Thus, only 5 bits of a byte (e.g., bits 3 through 7 of a byte having bits designated 0 through 7) are needed to identify a destination node address. The identification of a source node address is implied by the time slot, although that information may be sent in an additional byte if desired. The remaining 3 bits of a byte (e.g., bits 0 through 2) are used to identify eight special synchronizing and addressing codes defining various functions as shown in Table 1.

TABLE 1

| | | Bit | | | | | | | |
|---|---|---|---|---|---|---|---|---|---|
| Function | Sync | 0 | 1 | 2 | 3 | 4 | 5 | 6 | 7 |
| No Data | 1 | 0 | 0 | 0 | 0 | 0 | 0 | 0 | 0 |
| Word Sync | 1 | 1 | 1 | 1 | 1 | 0 | 1 | 0 | 1 |
| Device Address | 1 | 1 | 0 | 1 | x | x | x | x | x |
| Cyclo Sync | 1 | 1 | 1 | 0 | 1 | 0 | 1 | 0 | x |
| Name | 1 | 1 | 0 | 0 | x | x | x | x | x |
| Resource Alloc | 1 | 0 | 0 | 1 | D | x | x | x | x |
| Ring Delay | 1 | 0 | 1 | 1 | x | x | x | x | x |
| Inc Delay | 1 | 0 | 1 | 0 | x | x | x | x | x |
| Payload | 0 | D | D | D | D | D | D | D | D |

The first row in Table 1 shows a code 00H (i.e., 00 in hex) special synchronization word which is used to indicate that there is no data present for a particular time slot. This code is needed because time slots are always present in the data stream, and the destination receiving node will look at every time slot in the assigned channel. This word permits the source node to recognize that data was not available for a particular time slot.

The second row in Table 1 shows the word synchronization code, described above. In this code bits 0 through 2 are equal to 111.

The third row in Table 1 shows an addressing code word for specifying a destination address. This code is not needed when the CEBUS protocol is used to set up communications channels between nodes. In such a case, the destination address is already encoded in the control channel message as described in the industry standard EIA IS-60. Further, node address code zero is reserved for broadcast messages. The master node is node one. Thus, only 31 physical nodes are allowed in the system. When a message is broadcast, the sender assumes that it is received by all nodes. There is no acknowledgment, thus, reception is not certain.

The fourth row in Table 1 shows a bus cycle synchronization word, as illustrated in FIG. 2. In a bus cycle synchronization word, bits 0–2 equal to 110. The least significant bit of the bus cycle synchronization word carries a bit for the control channel, and is indicated by an X in Table 1, to indicate a 'don't care' condition. When the modulo 88 channel counter=0, the control channel has a slot. If the node counter and the message length counter in the master are zero, the master sends the cycle sync code. When a bus cycle synchronization word is received, each node can reset its counters if it has lost sync. If a bus cycle synchronization word is not detected within a reasonable time, the node can assume the bus is broken.

In one embodiment, the control channel may be assigned the job of node naming. In this case, there is no need to assign names or numbers to the nodes. However, in a preferred embodiment, the master node provides node numbering as a part of the initialization process. After word sync is accomplished as described above, the master sends the name command illustrated in the fifth row of Table 1, i.e., with bits 0–2 equal to 100 and with node address bits (bits 3–7) set to 00001. The number in the node address bits represents the node address of the transmitting node—the master node in this case. Each node that receives the name command, increments the number represented by the node address bits, uses this number as its node address, and sends the name command with its own node address in the node address bits to the next node. The master stops circulation of the command when it receives it after it has circulated around the loop. If a node has a delay of two word times (described in more detail below), that node increments the number represented by the node address bits of the name word it receives by 2. Thus, the node address of each node matches the delay time slot of that node.

The sixth row of Table 1 represents a link level resource allocation request word. A link level resource allocation request can be sent instead of a control channel message by setting bits 0–2 equal to 001. Each of bits 4 to 7 represents 2 adjacent data channels, e.g. bit 7 represents slots 0 and 1 for a total capacity of 22 Mbs; bit 6 represents slots 2 and 3, and so forth. It is envisioned that the link level resource allocation request word be used for simple nodes that have no capability to use the control channel. When such a node requires access to a bus channel, it transmits to the bus a resource allocation request with one of the bits corresponding to a desired pair of channels indicated in bits 4 to 7, instead of a-destination message address word. When a succeeding node receives a resource allocation request, it passes the request on unchanged to the next node if it has no conflict with the request. If the node is using the requested resource, it zeros the bit corresponding to the requested channel which is in use, and sends the modified word on to the next node. The source node then must remove the request from the ring. There is no other fairness rule or further arbitration. If the request returns without having the channels zeroed, the requesting node uses the channel. If the channel is unavailable, the requesting channel tries another of the four pairs of channels. If no channel is available, the process stops. The process could resume after a long random delay. This method of requesting use of data channels is envisioned for nodes which intend to use the channel for long sessions and for few simple nodes without control channel capability.

The seventh row of Table 1 illustrates a ring delay adjustment word, in which bits 0–2 are equal to 011. In general, each node must remove the messages it puts on the ring. To do this it must know the length of the delay on the ring in integer word times. This must be determined by the master node during the initialization process. The master node assumes the delay is at least the number of nodes in the system. The master counts the number of clock cycles required for the return of the name command (described above). This count is then rounded up to the next integer number of word cycles (of nine clock cycles) and is termed the ring delay. As described above, each node except the master node is corrected in time for the cable length from the previous node by the receipt of the word synchronization word. Thus, even though the delay between adjacent nodes (except master node) may exceed a word length, to the receiving node the delay appears to be zero. Thus, in general, each node except the master node adds a delay of 1 word time. The master node sees the total delay of the loop and adjusts that delay to a multiple of eight word times, unless fewer than four nodes are connected in the loop. If fewer than four nodes are connected, the delay is adjusted to a multiple of four word times, and the system is configured to have four channels of 22 Mbs each. The ring delay is increased by using the ring delay adjustment word until the total ring delay is correct.

The last row of Table 1 illustrates a payload data word. In a payload word, the most significant bit is a logic '0', and the remainder of the eight bits carry data to be transmitted from one node to another.

Nodes do not remove data from the ring (except as noted) during the initialization process, except for the master node. The bus cycle sync command indicates the end of the initialization process. Each node removes its transmissions some modulo 8 (or modulo 4) number of words after the bus cycle sync command. An alternative is a modulo 4 implementation in which either each node must know that it is in a ring of delay 4 or only the first four slots are allowed to be used. The latter is relatively easy to implement and reasonable because with only four nodes, the need for channel capacity is not generally as great.

It is necessary to consider the delay of the ring in making bus time slot assignments. That is, the bus time slots should be a modulus of the total ring delay and the multiplexing frequency. One approach is to fix the modulus of the ring delay. Each node must have the capability to insert a delay of up to two 9 bit words in it's input shift register 40, in case it is the master. This delay can also be used to adjust the delay of the ring. Thus, each node can be configured to introduce a delay of either one or two words. For a ring including just two or three nodes, the ring can thereby be adjusted to have a delay of four. In all other cases the ring can be adjusted to have a delay which is a modulus of 8 word times. In either case, ring delay adjustment occurs as follows.

After the total word delay around the ring is measured by the master node. If it is not a modulus 8 (or 4), a ring delay adjustment word is transmitted by the master to increase the delay. The first node to receive this word which has not already increased its delay, (i.e. it's delay is still one word) conditions itself to receive it's input word from the second nine bits of the input shift register 40 instead of the first nine bits. In this manner, that node introduces an extra word delay into the loop, and now has a delay of two words. This node then removes the word from the bus. This process is repeated until the correct number of word delays have been added to the ring and its word delay is modulo 8 (or modulo 4). One skilled in the art will also note that the ring cable length should be limited to approximately 18 meters to avoid the case of cabling itself adding more than one word delay. With such a system, it is relatively simple to add the multiplexing constraint of 8 channels. The basic system (see FIG. 2) is 11 cycles of 8 slots of 9 bit words. Every 88 slots, one slot is used for a synchronization word containing a control channel bit.

The BBUS system includes a CEBUS-compatible control channel. As specified in industry standard IS-60, the CEBUS control channel provides for a maximum bandwidth of 10k bits per second. Access to the control channel is arbitrated by the use of superior and inferior states on the bus much like a wired-or arbitration control channel. As described above and illustrated in FIG. 2, the BBUS system includes a bus cycle of 7.920 µs and one bus cycle synchronization word is sent every bus cycle. The control channel arbitration information and data is placed in the control channel bit of the cycle synchronization word. This physical layer allows for a maximum data bit rate equal to the bus cycle synchronization word rate. Aspects of the protocol corresponding to the known Data Link, Network, and Application Layers and the System Layer Manager of the CEBUS may be used to complete the control channel model. Also, the CEBUS Media Dependent Sub-Layer may be used for encoding and decoding data.

In the discussion below, the bit values, 1 and 0, are used to indicate a superior or inferior state signal in the control channel. For example, a superior state signal is when this field is set to a logic "1" signal, and the default inferior state signal is a logic "0" signal. In an actual implementation, this correspondence could be reversed.

The CEBUS carrier sense multiple access protocol with contention detection (CSMA-CD) method of arbitration and control channel access may be used to determine which node gets access to the control channel. At some point in the operation of the CEBUS, it must be determined whether to initiate an arbitration for access to the control channel. There are many different known techniques for determining when to initiate an arbitration. For example, an arbitration could be initiated whenever a node desires access to the control channel. Alternatively, an arbitration could be initiated whenever multiple nodes simultaneously desire access to the control channel. If an arbitration is necessary, it may be triggered in a known manner by monitoring the activity on the control channel, and triggering the arbitration when the bus has been inactive for longer than some predetermined period of time.

When an arbitration is triggered, an eight-bit preamble is computed by each node desiring access to the control channel. In a preferred embodiment, this preamble is generated as a random number in each node and is different for each arbitration. This will permit access to the bus to be granted fairly. Alternatively, each node could be preassigned a preamble representing the relative priority of each node. The preamble is used to arbitrate access to the control channel. The node that successfully arbitrates for the control channel is allowed to complete transmission of its message and all other nodes must wait for the next available time interval (determined as described above) before attempting to arbitrate for the control channel. The preamble and message are encoded for transmission as an alternating sequence of superior and inferior states. A symbol is represented by a state in the control bit of the cycle synchronization word, or series of states in the control bits of successive cycle synchronization words. The value of the symbol is conveyed by the amount of time until the next state transition. There are four basic symbols: logic '0', logic '1', End of Field (EOF) and End of Packet (EOP). Other symbols, such as End of Preamble Field and End of Symbol Field, are possible, but are not used in the exemplary system described below. One bus cycle (7.920 µs) equals one Unit Symbol Time (UST).

Symbol encoding is as follows:
1 UST=1
2 UST=0
3 UST=EOF
4 UST=EOP

Any of the information bearing symbols (1, 0, EOF, EOP) may be represented by either a superior or inferior state signals, or series of consecutive superior or inferior state signals. For example, a logic '1' signal is represented by a single superior state signal '1' or a single inferior state signal '0'. A logic '0' signal is represented by two consecutive superior state signals '11' or two consecutive inferior state signals '00', and so forth. Thus, the bits '0101' in the preamble may be represented by the control channel signals: 001001, i.e. two consecutive inferior state signals, representing a logic '0' signal, followed by a single superior state signal representing a logic '1' signal, followed by two consecutive inferior state signals representing a logic '0' signal, followed by a single superior state signal, representing a logic '1' signal. In a similar manner, the same bits in the preamble (i.e., the example '0101') may be represented by the control channel signals: 110110. It is the time lapse between state transitions which determines the symbol value.

Initial arbitration occurs by determining if control channel inactivity timing conditions are met. During control channel inactivity periods, inferior state signals are placed in the cycle synchronization word. Definitions of certain relevant terms follow. The "Control Bit Field" (CBF) is the bit in the cycle synchronization word that contains the CEBUS control channel information. A "Control Channel Cycle" begins when a node first places a superior state in the CBF and ends when an "End Of Packet" symbol (defined above) is transmitted by the node that wins the arbitration or there is a cycle time out. The "Write Node" is the first node to place a superior state in the CBF during the first control channel cycle. This begins the control channel arbitration cycle. "Competing Nodes" are all nodes that compete for the control channel located after the write node in the loop. "Late Nodes" are all nodes that compete for the control channel that are located before the write node in the loop and begin arbitration during the next bus synchronization cycle.

Referring again to FIG. 1, assume node A is the master node for the bus and assume Node C is the "Write Node". Nodes D and E can be competing nodes on the same bus cycle. Nodes A and B can also be competing nodes but are referred to as "late nodes" because they began arbitration on the succeeding bus synchronization cycle. The master node A receives the CBF from node E once some node has initiated a Control Bus Cycle. Otherwise it sets CBF to the inferior state, 0.

The arbitration rules are as follows:

First, a node may compete for access to the CEBUS control channel, provided it has met all the control channel inactivity timing requirements of IS-60. These timing requirements shall begin from the last observed superior state in the CBF.

Second, the CBF output from a node must be a superior state if that node receives a CBF having the superior state. Exceptions to this rule are given below. Nodes which are not contending for access to the control channel pass the received CBF unchanged to the next node.

Third, if a node places a CBF having an inferior state on the control channel and receives back a CBF having a superior state in the next bus cycle synchronization word, that node drops out of contention for the control channel.

Fourth, if a node is (still) competing for the control channel and the state of the next CBF output (based on the encoded random preamble) is a superior state, this node shall set the CBF to the superior state, even if it receives a superior state.

Fifth, the first node to successfully complete transmission of its encoded preamble and an "End-of-field" symbol (defined above) wins the control channel arbitration.

The rules for changing the CBF are as follows.

First, the first node to assert a superior state signal during the bus cycle after the control channel inactivity timing requirements are met is the write node.

Second, the CBF value may not be changed from the superior state except by the write node.

Third, all competing nodes may change the CBF from an inferior state to superior state.

Fourth, the designation of a node as the write node may be inherited by any node that changes the CBF from inferior to superior state. That is, if a node initially is not the write node, and that node receives an inferior state CBF, but changes it to a superior state based on its encoded preamble, that node becomes the write node.

Fifth, the write node status is lost by the node previously designated as the write node if that node receives a CBF other than the one it asserted on the control channel during the preceding bus cycle. In addition, that node drops out of contention for access to the control channel.

Figure 6:
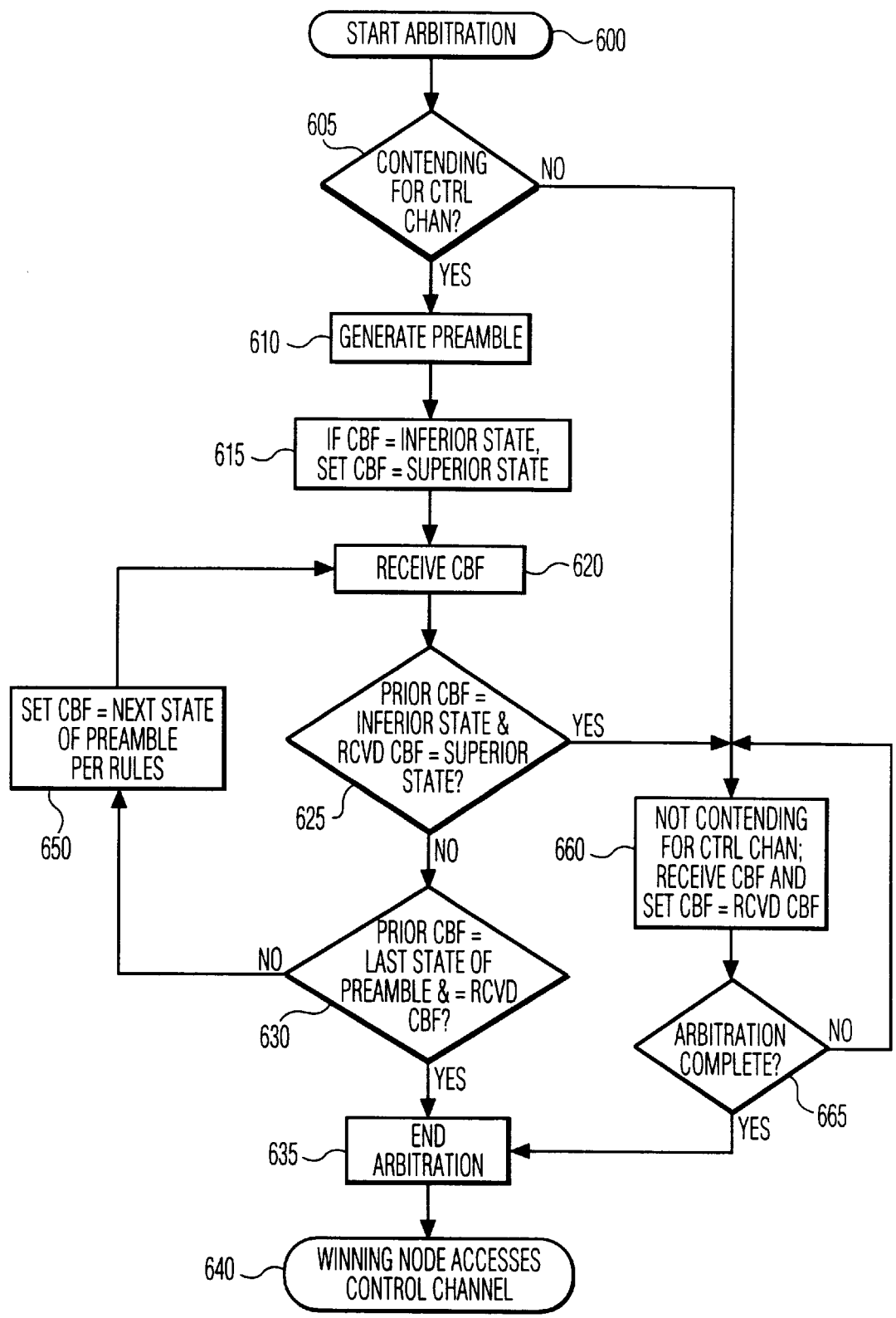
FIG. 6 is a flowchart illustrating operation of a data bus system in accordance with the invention.

The described operation may be better understood by referring to an example of arbitration operation that is shown in flowchart form in FIG. 6. In FIG. 6, arbitration begins at step 600. Step 605 determines whether a node is contending for access to the control channel, e.g., if the node has a control message to send. For a node that is not contending for control channel access, step 605 is followed by steps 660 and 665 which pass each received CBF state through the node unchanged until the end of arbitration. When arbitration is complete ("YES" result at step 665), step 665 is followed by steps 635 at which arbitration ends and step 640 at which the node that contends for access and wins arbitration accesses the control channel.

For a node that is contending for access to the control channel, step 605 is followed by step 610 at which a preamble is generated. A node that is contending for access to the control channel and that receives a CBF exhibiting an inferior state becomes a write node and initiates transmission of its preamble by setting CBF to a superior state at step 615. The next CBF is received at step 620. Step 620 is followed by step 625 which determines whether the prior CBF state was an inferior state while the received CBF is a superior state. If so ("YES" result at step 625), another node has changed the CBF to the superior state, i.e., another node has become the write node. Thus, step 625 is followed by step 660 at which the present node ceases contending for access to the control channel and, as described above, does not change subsequent CBF values, i.e., passes CBF values through the node. A "NO" result at step 625 indicates that the present node continues to be a "write" node resulting in the execution of step 630 after step 625. Step 630 determines whether the prior CBF state was both the last state of the preamble and the same state as the received CBF. A "YES" result at step 630 indicates that the node has successfully completed sending its preamble and, therefore, has won the arbitration. A "YES" result at step 630 is followed by step 635 which ends arbitration and step 640 at which the winning node accesses the control channel. A "NO" result at step 630 indicates that all preamble bits have not been sent and step 650 is executed. At step 650, the next CBF state produced by the node is determined by the next preamble state and by the rules set forth above for changing the CBF state. Step 650 is followed by step 620 at which the next CBF state is received.

As further explanation of the arbitration operation, a description of the first three bus synchronization cycles in an arbitration cycle follows. During the first bus cycle available for arbitration, e.g. meaning that there has been an absence of control channel activity for the required time period, the master node sets the Control Bit Field (CBF) in the bus cycle synchronization word to an inferior state signal '0'. Any node which desires control channel access begins to transmit its encoded preamble in the CBF by changing the CBF to the superior state 1, and that node becomes the write node. Subsequent nodes which are not competing for access to the control channel (termed non-competing nodes) take note of the superior state 1 of the received CBF and pass it to the next node, unchanged. Non-competing nodes must then wait for the next time when control channel inactivity times are met before they can compete for the control channel. From this point on in this arbitration cycle, the non-competing nodes will pass the CBF sent to them to the next node unchanged. Any node preceding the write node will not see the superior state 1 in the CBF during this first bus cycle in the arbitration cycle. The operation of such nodes will be described in more detail below.

In the case where two or more nodes are competing for control channel access, the first node will begin to transmit its encoded preamble by setting the CBF to the superior state. This is denoted below in the following manner: CBF(cycle#)=state. In this case, this is cycle 1 of the arbitration cycle, and the value is a superior state signal, represented by a 1, thus: CBF(1)=1. The first node to set the CBF to 1 knows it is the write node because it received CBF(1)=0. All subsequent arbitrating nodes will be competing nodes and will begin to transmit its encoded preamble in the same manner, by passing the CBF(1)=1 unchanged. The CBF value may not change from the superior state until it completes the loop (i.e. until it is received by the write node). As described above, all non-competing nodes pass the CBF as received and no longer compete for access to the control channel during this CC cycle.

During the second bus cycle in the arbitration cycle, the master detects that it has received the CBF(1)=1 and sets CBF(2)=1 in the next bus cycle synchronization word. There may be a node between the master node and write node which desires control channel access, but did not observe CBF(1)=1 in the preceding bus cycle. Such a node is called a late node. It, too, will begin to transmit its encoded preamble by passing the value CBF(2)=1. However, it is competing with the previous write node. The value CBF(2)=1 propagates through the ring until it reaches the write node. The write node may change the state of the CBF(2) to CBF(2)=0, or continue with CBF(2)=1 depending on the next state of its encoded preamble. If the next state in the encoded preamble of the write node is a superior state, then the write node sets CBF(2)=1. On the other hand, if the next state of the encoded preamble is an inferior state, then the write node sets CBF(2)=0. Subsequent nodes, similarly continue to attempt to transmit their own encoded preambles. The rules set forth above govern whether a subsequent node may change the state of the CBF(2).

If the write node maintains the state of the CBF(2) as a superior state, i.e. CBF(2)=1, then, as set forth in the rules above, each succeeding competing node determines the next state of its encoded preamble. If the next state of its encoded preamble is the superior state, then that node passes CBF(2)=1, and remains in contention for access to the control channel. If the next state is the inferior state, then that node passes CBF(2)=1, but drops out of contention for access to the control channel. From this time forward in the arbitration cycle, this node passes the CBF to the next node unchanged.

If the write node changes the state of the CBF(2) to an inferior state, i.e. CBF(2)=0, then subsequent nodes may assert a superior state 1 over this change by setting CBF(2)=1. If the next state in the encoded preamble of a subsequent node is a superior state 1, then that node transmits CBF(2)=1. When this occurs, that node inherits the write node status. If the next state of the encoded preamble of the subsequent node is an inferior state, then that node passes CBF(2)=0, and remains in contention for access to the control channel.

In the third bus cycle in the arbitration cycle, the master receives CBF(2)=0 and sets CBF(3)=0, or receives CBF(2)=1 and sets CBF(3)=1. A late node, in a similar manner to that described above for contending nodes, determines the next state of its encoded preamble, and can then set the CBF(3)=0 or CBF(3)=1, or be dropped from contention for access to the control channel, all in accordance with the rules described above. This occurs for all late nodes.

At some point, the write node receives the CBF(3). If the write node had previously set the CBF(2)=1, then it must receive back the CBF(3)=1. The write node then sets the CBF(3) to the next state in its encoded preamble, as was done in control channel cycle two (described above) of the arbitration cycle. If the write node had previously set the CBF(2)=0, and receives the CBF(3)=0, then the write node is still the write node, is still in contention for access to the control channel, and can change the value of CBF(3) to the next state of its encoded preamble. If the write node had previously set the CBF(2)=0, but received the CBF(3)=1, then it is no longer the write node, and is no longer in contention for access to the control channel. From this point on in the arbitration cycle, this node passes the received CBF unchanged to the next node.

The operation described above continues for subsequent bus cycles. Each node which remains in contention for access to the control channel either sets the CBF to the next state in its encoded preamble, or drops out of contention for access to the bus. After the preamble has been transmitted, each node still in contention attempts to transmit the states of an end-of-field symbol, which, as described above, is three consecutive superior or inferior state signals. The first node to successfully transmit and receive its encoded preamble followed by the end-of-field symbol has won the arbitration and may begin to transmit its message in the CBF of the bus cycle synchronization words.

To summarize the preceding description, at the end of the preamble and end of field symbol, the node that remains designated as the write node has successfully arbitrated for access to the node. The write node status is inherited by any node that changes the CBF from an inferior to a superior state. The write node status is lost when the write node receives back a CBF different than the one it placed on the control channel.

Five examples of control bit field values follow. Each example is illustrated in a table. Each node is represented by a column in the table. The second row in the table shows the randomly generated preambles for the nodes contending for access to the control channel. The third row in the table shows the preambles encoded according to the rules given above. As described above, the first state for encoding the preambles is the superior state. The remaining rows show the states of the CBF as it is produced by each node in succeeding bus cycles. The fourth row is the zeroeth cycle and represents the last cycle of control channel inactivity before an arbitration cycle is initiated.

| Cycle | Node A | Node B | Node C | Node D | Node E |
|---|---|---|---|---|---|
| Preamble | | 10101101 | | 10001111 | |
| Encoded Preamble | | 110010010110 | | 10011001010 | |
| 0 | 0 | 0 | 0 | 0 | 0 |
| 1 | 0 | 0 | 0 | 1 | 1 |
| 2 | 1 | 1 | 1 | 0 | 0 |
| 3 | 0 | 1 | 1 | 1 | 1 |
| 4 | 1 | 0 | 0 | 0 | 0 |
| 5 | 0 | 0 | 0 | 0 | 0 |
| 6 | 0 | 1 | 1 | 1 | 1 |
| 7 | 1 | 0 | 0 | 0 | 0 |

-continued

| Cycle | Node A | Node B | Node C | Node D | Node E |
|---|---|---|---|---|---|
| 8  | 0 | 0 | 0 | 0 | 0 |
| 9  | 0 | 1 | 1 | 1 | 1 |
| 10 | 1 | 0 | 0 | 0 | 0 |
| 11 | 0 | 1 | 1 | 1 | 1 |
| 12 | 1 | 1 | 1 | 1 | 1 |
| 13 | 1 | 0 | 0 | 0 | 0 |
| 14 | 0 |   |   |   |   |

EXAMPLE 1

In example 1, node A is the master node, node D initiates the on cycle, and node B is a late node competing with node D for the control channel. The master node, node A, maintains an state 0 in the CBF in the time period preceding the arbitration illustrated in cycle 0, and the first portion of bus cycle 1. In bus cycle 1, node D initiates the arbitration cycle by asserting a superior state in the CBF as the first state of its encoded preamble. Node E and node A are not competing nodes, and pass this signal to node B in bus cycle 2. Node B is a late node, and passes the superior state to node C. Node C is also not a competing node, and passes the superior state back to node D. Node D, when it receives back the CBF(2), in cycle 2, changes it to CBF(2)=0, representing the next state in its encoded preamble. This is passed to node B in cycle 3 by nodes E and A. Node B receives a 0 in cycle 3, but changes it to a 1, as the next state of its encoded preamble. Node B now becomes the write node. The 1 is passed by node C to node D. Node D transmitted a 0 in cycle 2 but received a 1 in cycle 3. Node D, therefore, drops from contention for access to the control channel. All nodes but node B now become passive and pass the received CBF to the next node unchanged. Eventually, node B successfully transmits and receives its encoded preamble followed by an end-of-field symbol, and acquired access to the control channel.

| Cycles | Node A | Node B | Node C | Node D | Node E |
|---|---|---|---|---|---|
| Preamble |  |  |  | 10001111 | 01010110 |
| Encoded Preamble |  |  |  | 10011001010 | 110110110100 |
| 0  | 0 | 0 | 0 | 0 | 0 |
| 1  | 0 | 0 | 0 | 1 | 1 |
| 2  | 1 | 1 | 1 | 0 | 1 |
| 3  | 1 | 1 | 1 | 1 | 0 |
| 4  | 0 | 0 | 0 | 0 | 1 |
| 5  | 1 | 1 | 1 | 1 | 1 |
| 6  | 1 | 1 | 1 | 1 | 0 |
| 7  | 0 | 0 | 0 | 0 | 1 |
| 8  | 1 | 1 | 1 | 1 | 1 |
| 9  | 1 | 1 | 1 | 1 | 0 |
| 10 | 0 | 0 | 0 | 0 |   |

EXAMPLE 2

In example 2, node D initiates an arbitration cycle by setting CBF(1)=1 as the first state of its encoded preamble, and is the write node. Node E is a competing node, and passes the CBF(1)=1 it receives from node D. Nodes A, B and C are non-competing nodes, and pass received CBF values to the next node unchanged. In cycle 2, node D receives the CBF(2)=1 from node C and changes it to CBF(2)=0 as the next state in its encoded preamble. Node E receives the CBF(2)=0 in cycle 2. However, the next state in node E's encoded preamble is 1. Node E, therefore, sets CBF(2)=1, and becomes the write node. In cycle 2, node D set the CBF(2)=0, but in cycle 3, node D receives the CBF(3)=1. Node D, therefore knows it has lost the arbitration, and drops out of contention for access to the control channel. At this point, all nodes except node E are out of contention for access to the control channel, and pass the received CBF value to the next node unchanged. Node E eventually transmits its complete encoded preamble and following end-of-field symbol, and acquires access to the control channel.

| Cycles | Node A | Node B | Node C | Node D | Node E |
|---|---|---|---|---|---|
| Preamble |  |  |  | 10001111 | 10110110 |
| Encoded Preamble |  |  |  | 10011001010 | 10010110100 |
| 0  | 0 | 0 | 0 | 0 | 0 |
| 1  | 0 | 0 | 0 | 1 | 1 |
| 2  | 1 | 1 | 1 | 0 | 0 |
| 3  | 0 | 0 | 0 | 0 | 0 |
| 4  | 0 | 0 | 0 | 1 | 1 |
| 5  | 1 | 1 | 1 | 1 | 1 |
| 6  | 1 | 1 | 1 | 0 | 0 |
| 7  | 0 | 0 | 0 | 0 | 0 |
| 8  | 0 | 0 | 0 | 1 | 1 |
| 9  | 1 | 1 | 1 | 0 | 0 |
| 10 | 0 | 0 | 0 | 1 | 1 |
| 11 | 1 | 1 | 1 | 0 | 0 |
| 12 | 0 | 0 | 0 |   |   |

EXAMPLE 3

In example 3, node D initiates an arbitration cycle in cycle 1 by setting the CBF(1)=1. Node E is a contending node, and passes CBF(1)=1 to node A. Nodes A, B and C are non-contending nodes which pass the received CBF values to the next node unchanged. In cycle 2, node D receives CBF(2)=1. The next state of the encoded preamble for node D is 0, so node D sets CBF(2)=0. Node E receives the CBF(2)=0. The next state of node E's preamble is also 0, so node E remains in contention for access to the control channel, and sets CBF(2)=0. In cycle 3, the same occurs again. In cycle 4, node D receives the CBF(4)=0. The next state of its encoded preamble is 1, so node D sets CBF(4)=1. Node E receives CBF(4)=1 from node D. As in cycle 1, then next state of its preamble is 1, so node E remains in contention and sets CBF(4)=1. In cycle 5, node D receives the CBF (5)=1. The next state of its preamble is 1, so node D sets CBF(5)=1. Node E receives CBF(5)=1. However, the next state of its preamble is 0. Node E, therefore, drops out of contention for access to the control channel, and passes the received CBF to node A unchanged during the remainder of the arbitration cycle. Eventually node D successfully sends its encoded preamble followed by an end-of-filed symbol, and acquires access to the control channel.

| Cycles | Node A | Node B | Node C | Node D | Node E |
|---|---|---|---|---|---|
| Preamble |  |  |  | 11110111 | 11110111 |
| Encoded Preamble |  |  |  | 101011010 | 101011010 |

-continued

| Cycles | Node A | Node B | Node C | Node D | Node E |
|---|---|---|---|---|---|
| 0 | 0 | 0 | 0 | 0 | 0 |
| 1 | 0 | 0 | 0 | 1 | 1 |
| 2 | 1 | 1 | 1 | 0 | 1 |
| 3 | 0 | 0 | 0 | 1 | 0 |
| 4 | 1 | 1 | 1 | 0 | 1 |
| 5 | 0 | 0 | 0 | 1 | 1 |
| 6 | 1 | 1 | 1 | 1 | 1 |
| 7 | 1 | 1 | 1 | 0 | 0 |
| 8 | 0 | 0 | 0 | 1 | 1 |
| 9 | 1 | 1 | 1 | 0 | 0 |
| 10 | 0 | 0 | 0 | 1 | 1 |
| 11 | 1 | 1 | 1 | 1 | 1 |
| 12 | 1 | 1 | 1 | 1 | 1 |
| 13 | 1 | 1 | 1 | 0 | |

EXAMPLE 4

In example 4, both randomly generated preambles are the same. Node D initiates an arbitration cycle in cycle 1 by setting CBF(1)=1. Node E is a contending node and receives the CBF(1)=1. It, too, sets CBF(1)=1. Nodes A, B and C are non-contending nodes which pass the received CBF to the next node unchanged. In cycle 2, node D receives the CBF(2)=1. The next state of its encoded preamble is 0, so it sets CBF(2)=0. Node E receives the CBF(2)=0. The next state of its preamble is 0, so it remains in contention, and sets CBF(2)=0. Because the encoded preambles are identical, this continues through cycle 9. In cycle 10, node D sets CBF(10)=1 as the first state of the end-of-field symbol, defined above. In a similar manner as in the first nine cycles, node E also is sending an end-of-field symbol and sets CBF(10)=1. This continues until cycle 13. At cycle 13, node D receives back the last state of the end-of-field symbol and acquires access to the control channel. Whether the first bit of the message is a logic '1' (which would be transmitted as a single 0) or logic '0' (which would be transmitted as two consecutive 1's) the first state placed on the control channel is 0. Node E receives CBF(13)=0, but it had transmitted CBF(12)=1. It, therefore, drops from contention, and node D acquires access to the control channel.

| Cycles | Node A | Node B | Node C | Node D | Node E |
|---|---|---|---|---|---|
| Preamble | | 11110111 | | 11110111 | |
| Encoded Preamble | | 101011010 | | 101011010 | |
| 0 | 0 | 0 | 0 | 0 | 0 |
| 1 | 0 | 0 | 0 | 1 | 1 |
| 2 | 1 | 1 | 1 | 0 | 1 |
| 3 | 0 | 0 | 0 | 1 | 0 |
| 4 | 1 | 1 | 1 | 0 | 1 |
| 5 | 0 | 0 | 0 | 1 | 1 |
| 6 | 1 | 1 | 1 | 1 | 1 |
| 7 | 1 | 1 | 1 | 0 | 0 |
| 8 | 0 | 0 | 0 | 1 | 1 |
| 9 | 1 | 1 | 1 | 0 | 0 |
| 10 | 0 | 0 | 0 | 1 | 1 |
| 11 | 1 | 1 | 1 | 1 | 1 |
| 12 | 1 | 1 | 1 | 1 | 1 |
| 13 | 1 | 1 | 0 | | |

EXAMPLE 5

Example 5 is similar to example 4, except that node B is a late node. The preambles of both nodes B and D are identical. Node D initiates the arbitration cycle by setting CBF(1)=1 in cycle 1. Nodes A, C and E are non-competing nodes, passing received CBF values to the next node unchanged. As with example 4, the encoded preambles of both nodes B and D are identical, and each remains in contention for access to the control channel through cycle 10. In cycle 10, node D begins to send an end-of-field symbol. In cycle 11, node B also begins to send an end-of-field symbol. Again, both nodes remain in contention for access to the control channel through cycle 12. In cycle 13, node B receives CBF(13)=1, which indicates successful transmission of its encoded preamble and a following end-of-field symbol. Node B, thus, acquires access to the control channel. As with example 4, node B begins transmission of its message by setting CBF(13)=0. Node D receives CBF(13)=0, and drops out of contention for access to the control channel.

What is claimed is:

1. A data bus system, comprising:
 a plurality of nodes;
 a ring bus coupling the plurality of nodes together; wherein:
 the ring bus transmits successive bus cycles, each bus cycle containing a plurality of bus words, one of which is a bus cycle synchronization word and the remainder of which are data words, wherein the plurality of data words are allocated to a plurality of data channels, wherein each of said plurality of nodes are able to receive a plurality of data words simultaneously, said nodes each performing an arbitration upon receipt of more than one bus word, wherein during arbitration each of contending nodes generates a preamble having a number of successive states, each state being one of a superior state and an inferior state, wherein the comparison of the successive states with a control bit field determines the access to the control channel.

2. The bus system of claim 1 wherein:
 each of the plurality of nodes includes an input and an output connector; and
 the ring bus comprises a plurality of cables, each including a forward data path and a reverse data path and a plug on each end of the cable, respective cables being coupled between the input connector of one node and the output connector of a preceding node in the ring bus, and between the output connector of the one node and the input connector of a succeeding node in the ring bus.

3. The bus system of claim 2 wherein:
 the input and output connector in each node each includes a forward path terminal and a reverse path terminal; and
 each node further includes:
  an input and an output register;
  a detector for determining when a plug is inserted into the input and output connector; and
  a switch for coupling the reverse path terminal in the output connector to the input register, and the output register to the forward path terminal in the output connector when the detector detects that a plug is inserted into the output connector and no plug is inserted into the input connector, for coupling the forward path terminal in the input connector to the input register and the output register to the reverse path terminal in the input connector when the detector detects that a plug is inserted into the input connector and no plug has been inserted into the output connector, and for coupling the forward path terminal in the input connector to the input register, the output register to the forward path terminal in the output connector and the reverse path terminal in the output connector to the reverse path terminal in the input connector when the detector detects that a plug is inserted into both the input and the output connector.

4. The bus system of claim 2 further including a first node in the bus system having a cable connected only to its output connector, and a last node in the bus system having a cable connected only to its input connector.

5. The bus system of claim 4 wherein the first node in the bus system is designated the master node and performs initialization of the bus system.

6. The bus system of claim 5 wherein:

the master node assigns a mutually different identification number to each other node during the initialization of the bus system by sending a synchronization word including a name command around the ring bus, the name command having an identification field; wherein:

the master node is assigned an identification number of 1, and transmits the name command having the identification field set to 1; and each node receiving the name command increments the identification field, assigns itself the identification number of the incremented identification field, and transmits the name command to the next node with the its identification number in the identification field.

7. The bus system of claim 5 wherein:

each node comprises an input register containing sufficient bits to contain at least two data words, is capable of routing a word from its input connector to its output connector with one of a one word delay and a two word delay, and initially routes a word from its input connector to its output connector with a one word delay;

the master node adjusts the word delay around the ring bus to be modulo a predetermined number of words by sending successive ring delay commands through the ring, each node receiving a ring delay command responding by routing a word from its input connector to its output connector with two word delays and removing the ring delay command from the bus.

8. The bus system of claim 7, wherein if there are fewer than four nodes on the ring, the master node adjusts the word delay around the ring bus to be a first delay period, and if there are more than three nodes on the ring, the master node adjusts the word delay around the ring bus to be a second delay period.

9. The bus system of claim 5 wherein:

each node comprises a node clock; and the master node performs synchronization of the word clocks in the plurality of nodes by transmitting a word synchronization command through the ring bus to the plurality of nodes.

10. The bus system of claim 9 wherein the master node comprises an input register having at least sufficient bits to hold two words, and compensates for non-integer word delays through the ring bus by detecting which bits in its input register contain the word synchronization command at a word time and using that location in its input register to receive words from the bus.

11. The bus system of claim 1 further comprising a control channel, in which one bit of the control channel is carried in each bus cycle synchronization word.

12. The bus system of claim 1 wherein each bus word contains a synchronization bit and a plurality of data bits.

13. The bus system of claim 12 wherein the number of bits in the plurality of data bits is eight bits.

14. The bus system of claim 12 wherein data words have the synchronization bit set to logic '0' and commands and synchronization words have the synchronization bit set to logic '1'.

15. The bus system of claim 1 wherein the plurality of bus words in each bus cycle is 88 words.

16. The bus system of claim 1 wherein the ring bus transmits a constant number of data channels, and the plurality of data words are partitioned into successive groups, each group containing a number of data words equal to the constant number of data channels, and the data words in each group are allocated to respectively different data channel.

17. The bus system of claim 16 wherein the constant number of data channels is eight data channels.

* * * * *